US008359417B2

(12) United States Patent
Shuholm et al.

(10) Patent No.: US 8,359,417 B2
(45) Date of Patent: Jan. 22, 2013

(54) AUDIO/VIDEO ROUTER

(75) Inventors: Kevin J. Shuholm, Grass Valley, CA (US); Jeffrey S. Evans, Grass Valley, CA (US); Robert W. Hudelson, Grass Valley, CA (US); Charles S. Meyer, Nevada City, CA (US)

(73) Assignee: Miranda Technologies Inc., Montreal (CA)

( * ) Notice: Subject to any disclaimer, the term of this patent is extended or adjusted under 35 U.S.C. 154(b) by 0 days.

(21) Appl. No.: 12/986,113

(22) Filed: Jan. 6, 2011

(65) Prior Publication Data

US 2012/0017014 A1 Jan. 19, 2012

Related U.S. Application Data

(60) Provisional application No. 61/365,185, filed on Jul. 16, 2010.

(51) Int. Cl.
*G06F 3/00* (2006.01)
*G06F 5/00* (2006.01)
*G06F 13/12* (2006.01)
*G06F 13/38* (2006.01)

(52) U.S. Cl. .................. 710/64; 710/1; 710/36; 710/51; 710/62; 710/65

(58) Field of Classification Search ....................... 710/65
See application file for complete search history.

(56) References Cited

U.S. PATENT DOCUMENTS

| 5,113,516 | A   | * | 5/1992  | Johnson         | 710/65  |
|-----------|-----|---|---------|-----------------|---------|
| 6,324,165 | B1  | * | 11/2001 | Fan et al.      | 370/232 |
| 6,359,911 | B1  | * | 3/2002  | Movshovich et al.| 370/536|
| 7,230,652 | B2  | * | 6/2007  | Demas et al.    | 348/512 |
| 7,394,806 | B2  | * | 7/2008  | Beshai et al.   | 370/380 |
| 2002/0136496 | A1 | * | 9/2002 | Eldada          | 385/39  |
| 2007/0110087 | A1 | * | 5/2007 | Abel et al.     | 370/412 |
| 2007/0171900 | A1 | * | 7/2007 | Beshai et al.   | 370/380 |
| 2007/0180166 | A1 | * | 8/2007 | Southerland et al. | 710/65 |
| 2007/0206946 | A1 | * | 9/2007 | Beshai          | 398/4   |
| 2010/0272113 | A1 | * | 10/2010| Luders          | 370/401 |

* cited by examiner

*Primary Examiner* — Chun-Kuan Lee
*Assistant Examiner* — Getente A Yimer
(74) *Attorney, Agent, or Firm* — Chernoff Vilhauer McClung Stenzel LLP

(57) ABSTRACT

A composite input signal having an audio component and a video component is routed from an input to an output by separating a stream of audio data words at an average frequency F1 from the video component and supplying the separated stream of audio data words sequentially to a FIFO input register. The output of the FIFO input register is polled at a frequency F2, greater than F1, and, in the event that an audio data word is available at the output of the FIFO input register, the audio data word is conveyed from the output of the FIFO input register to an input of a signal path. Otherwise a null data word is conveyed to the input of the signal path. The signal path thereby conveys a stream of data words that comprises both audio data words and null data words. The audio data words of the stream conveyed by the path are combined with the video component of the composite input signal.

10 Claims, 5 Drawing Sheets

AUDIO/VIDEO ROUTER

CROSS-REFERENCE TO RELATED APPLICATION

This application claims benefit of Provisional Application No. 61/365,185 filed Jul. 16, 2010, the entire disclosure of which is hereby incorporated by reference herein for all purposes.

BACKGROUND

The subject matter of this application relates to an audio/video router.

Referring to FIG. 1 of the drawings, a television program provider may operate a production facility 6 at which it produces a digital television (DTV) program signal AV having a baseband video component representing a sequence of pictures and a corresponding baseband audio component. We will assume for the purpose of this discussion that the baseband video component is in the high definition serial digital interface (HD-SDI) format specified in SMPTE 292M and that the baseband audio component includes at least one channel of digital audio data that is encoded in accordance with the standard known as AES3 and is embedded in the horizontal ancillary data space of the HD-SDI video signal (defined by SMPTE 292M) in accordance with the mapping defined in SMPTE 299M. It will be understood by those skilled in the art that the HD-SDI video signal is able to accommodate up to 16 audio channels, organized as four groups each containing four audio channels. Typically, a channel of the baseband audio component is derived from an analog audio signal that has been sampled at 48 kHz, and each line of the horizontal ancillary (HANC) data space of the HD-SDI signal carries 0, 1 or 2 audio samples.

In accordance with the AES3 standard, each audio data sample has 20 or 24 bits and is placed in an AES subframe having 32 bits. Four bits of the subframe form a preamble that is used for synchronizing purposes. Two AES subframes form an AES frame. Generally, the two audio data samples that are placed in the two subframes of an AES frame are related, for example as left and right channel stereo components, and the mapping scheme maintains a constant time relationship between the two samples through embedding and subsequent disembedding.

For convenience in set up and use of the illustrated equipment there will generally be a consistent mapping between audio signal sources and the channels that convey the respective audio data streams provided by the audio signal sources. For example, the audio data samples derived from left and right channel stereo components of an audio signal would typically be conveyed in two adjacent channels (e.g. channels 1 and 2 or channels 3 and 4) of the HD-SDI signal.

Audio data may alternatively be encoded using Dolby E packets, which may be conveyed using a data structure similar to AES frames. A single Dolby E packet cannot be accommodated by an AES subframe and therefore the Dolby E packet is split into two subpackets that are placed in the two subframes respectively of the AES frame. Thus, in the event that Dolby E packets are embedded in an HD-SDI signal, the two subpackets of the Dolby E packet are conveyed in two adjacent channels respectively.

Still referring to FIG. 1, the program signal is supplied to a program signal router 8 that receives the program signal at an input and directs the program signal to a selected destination via an output of the program signal router. It will be appreciated that the program signal router would normally have many inputs and many outputs and can be configured to direct the program signal received at any selected input to any exclusive set of one or more destinations.

In practice, it may be desirable to switch the audio component of the program signal separately from the video component. This may be accomplished by disembedding the audio component from the program signal, supplying the program signal and the audio component to a video switch 10 and an audio switch 12 respectively, and re-embedding the audio component in the program signal downstream of the video switch 10. In a practical implementation, the video switch is an X-Y space switch having row and column conductors that can be selectively interconnected by crosspoint switch elements whereas the audio switch is a shared memory time switch.

Operation of a shared memory time switch that can route a signal provided by one of four sources to an exclusive set of at least one of four destinations will be described with reference to FIG. 2. Digital data words from respective sources are supplied to input registers 16, each of which is assigned a position in a sequence that contains all the input registers. Typically, the assigned position of an input register 16 reflects the spatial location of an input terminal, such as a connector, to which the input register is connected. A controller (not shown) read enables the input registers sequentially and accordingly the data words are placed sequentially on a bus 18. The controller controls the read enable command supplied to the input registers and the state of the bus 18 so that the data words are placed on the bus in successive bus operating cycles. Consequently, the position of a data word from a particular input register in the sequence of bus operating cycles depends strictly on the assigned position of the input register. The sequence of data words is written to successive addresses in a memory array 20, and the address to which a data word is written depends strictly on the position of the data word in the sequence of bus operating cycles and hence on the spatial location of the input terminal at which the data word was received.

Data words are read from the memory array 20 and each word is placed on an output bus 22 in at least one of four time slots of the bus operating cycle. The output bus thus conveys up to four interleaved digital signals. The switch also comprises four output registers 24 whose outputs are connected respectively to the four output terminals of the switch. Analogously to the input registers, each output register 24 is assigned a position in a sequence that contains all the output registers and typically the assigned position of an output register reflects the spatial location of the output terminal to which the output register is connected. The controller controls the read enable command supplied to the output registers and the state of the bus 22 so that each output register reads the data words that are in an assigned time slot of the bus operating cycle.

The controller receives an operator command specifying the output(s) to which a given input signal is to be directed, and generates read enable commands that will result in the data words of the input signal being routed to the appropriate outputs. Suppose, for example, that the operator sets the controller to select the signal received at the input terminal connected to the input register $16_1$ for routing to the output terminals connected to the output registers $24_1$ and $24_3$. In this case, the controller controls the read enable commands supplied to the memory array so that the data words that were supplied to the memory array in time slot 1 of the bus operating cycle are placed on the output bus in both time slot 1 and time slot 3 of the bus operating cycle. The output registers $24_1$ and $24_3$ read the signal on the output bus in time slots 1 and 3 respectively of the bus operating cycle. Accordingly, the data words of the signal received at the input terminal connected to the input register $16_1$ are routed both to the output terminal connected to the output register $24_1$ and to the output terminal connected to the output register $24_3$.

Referring again to FIG. 1, the audio switch 12 is designed to receive sample words, each containing one audio sample, from the disembedder 26 at a uniform rate of 48 ks/s and supply sample words to the embedder 28 at a uniform rate of 48 ks/s. Because the number of audio samples per line of the video signal varies between 0 and 2, a FIFO register 30 at the input of the audio switch 12 is used to match the rate at which the disembedder outputs sample words to the rate at which the switch 12 receives sample words, and similarly a FIFO register 32 at the output of the audio switch is used to match the rate at which the switch 12 supplies sample words to the rate at which the embedder 28 receives sample words. In order to ensure that a sample word is always available to read from the input FIFO 30 when required by the audio switch, the input FIFO must be able to contain up to 64 sample words and, on average, it contains 32 sample words. Similarly, in order to meet the demands of circuitry that specifies the number of samples that the embedder must insert on each line of the video signal, the output FIFO 32 must be able to contain up to 64 sample words and its average content is 32 sample words. Consequently, the average delay suffered by an audio sample in passing through the FIFOs and the audio switch is 64 sample times plus the delay through the audio switch (between 3 and 5 sample times), or about 1.43 ms. In comparison, the delay suffered by the video component of the HD-SDI program signal in passing through the video switch is negligible. This difference in delay between the video component and the audio component may cause objectionable lip sync error.

SUMMARY OF THE INVENTION

In accordance with a first aspect of the subject matter disclosed herein there is provided an audio/video router for receiving a composite input signal having an audio component and a video component at an input of the router and providing a composite output signal containing the audio component and the video component at an output of the router, the router comprising an input formatter for receiving the composite input signal and providing an intermediate stream of data words, a switch core for receiving the intermediate stream of data words and providing the intermediate stream of data words to an output of the switch core, and an output formatter for receiving the intermediate stream of data words from the output of the switch core, wherein the input formatter comprises a demultiplexer for receiving the composite input signal and separating a stream of audio data words at an average frequency F1 from the video component, a FIFO input register for receiving the separated stream of audio data words at an input of the FIFO input register and making the audio data words available successively at an output of the FIFO input register, and a read enable device for polling the output of the FIFO input register at a frequency F2, greater than F1, and, in the event that an audio data word is available at the output of the FIFO input register, conveying the audio data word from the output of the FIFO input register to the switch core and otherwise conveying a null data word to the switch core, whereby the intermediate stream of data words comprises both audio data words and null data words, and wherein the output formatter comprises a multiplexer for combining the audio data words of the intermediate stream with the video component of the input signal to provide said composite output signal.

In accordance with a second aspect of the subject matter disclosed herein there is provided a method of routing a composite input signal having an audio component and a video component from an input to an output, comprising separating a stream of audio data words at an average frequency F1 from the video component, supplying the separated stream of audio data words sequentially to a FIFO input register, polling an output of the FIFO input register at a frequency F2, greater than F1, and, in the event that an audio data word is available at the output of the FIFO input register, conveying the audio data word from the output of the FIFO input register to an input of a signal path and otherwise conveying a null data word to the input of the signal path, whereby the signal path conveys a stream of data words that comprises both audio data words and null data words, combining the audio data words of said stream with the video component of the composite input signal.

In accordance with a third aspect of the subject matter disclosed herein there is provided a method of operating a router having a plurality of channel inputs and a plurality of channel outputs and a switch core for selectively connecting at least two of the channel outputs to respective channel inputs, wherein each channel output is connected to an output signal path comprising a FIFO register and the router is configured so that first and second adjacent channel outputs are connected to first and second channel inputs, said method comprising changing the router configuration so that the first and second channel outputs are connected to adjacent channel inputs respectively and forcing the FIFO registers in the output signal paths of the first and second adjacent channel outputs to equal fullness.

BRIEF DESCRIPTION OF THE DRAWINGS

For a better understanding of the invention, and to show how the same may be carried into effect, reference will now be made, by way of example, to the accompanying drawings, in which.

In the following detailed description, subscripts may be used to distinguish instances of corresponding elements.

DETAILED DESCRIPTION

Figure 1:
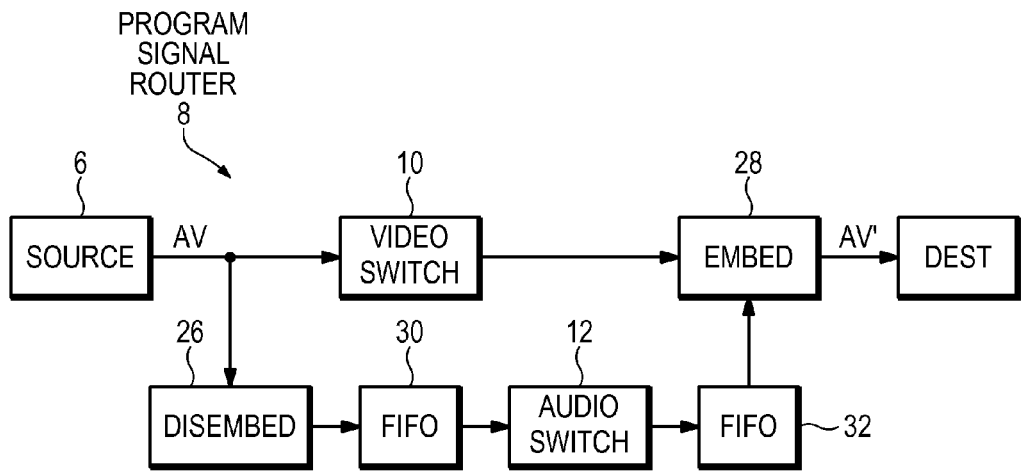
FIG. 1 is a schematic block diagram illustrating a router for routing a program signal from a source to at least one destination.
Figure 2:
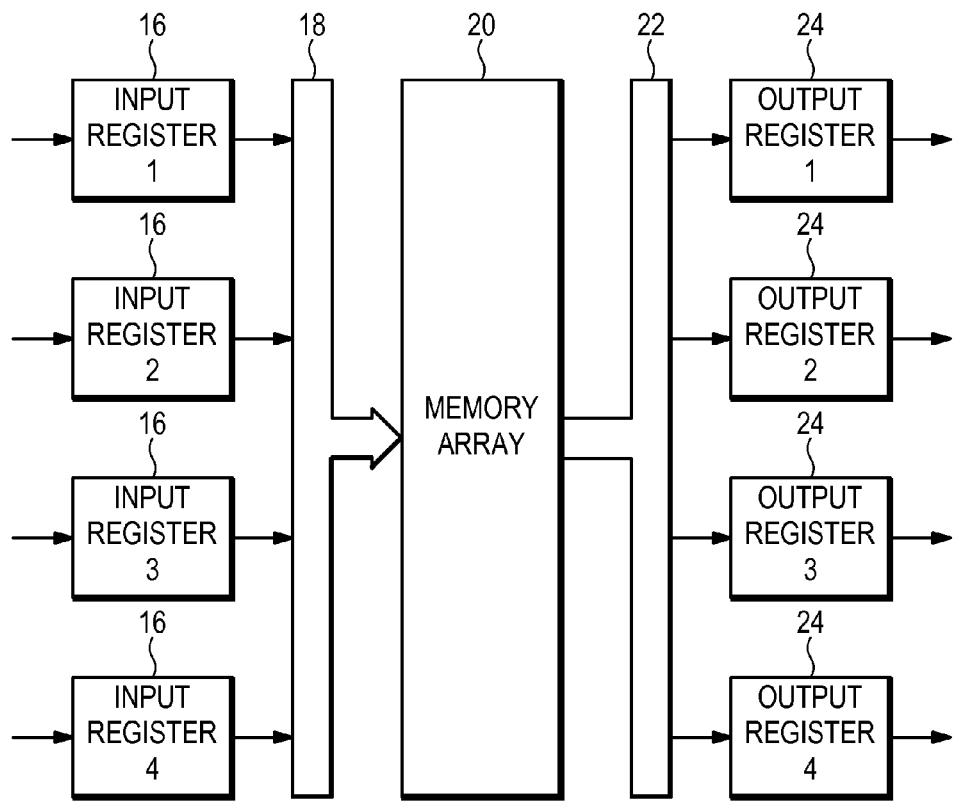
FIG. 2 illustrates operation of a shared memory time switch.

The subject matter disclosed herein will be described with reference to a router having 128 inputs and 128 outputs. Each router input may be connected to a source 36 that delivers an HD-SDI signal AV containing a video component and an audio component to the router input and each router output may be connected to a destination 38. Thus, the router is able to serve up to 128 sources 36 and up to 128 destinations 38.

We will assume that the router is configured so that the signal AV received from source $36_1$ is to be routed to destinations $38_1$ and $38_{17}$.

Figure 3:
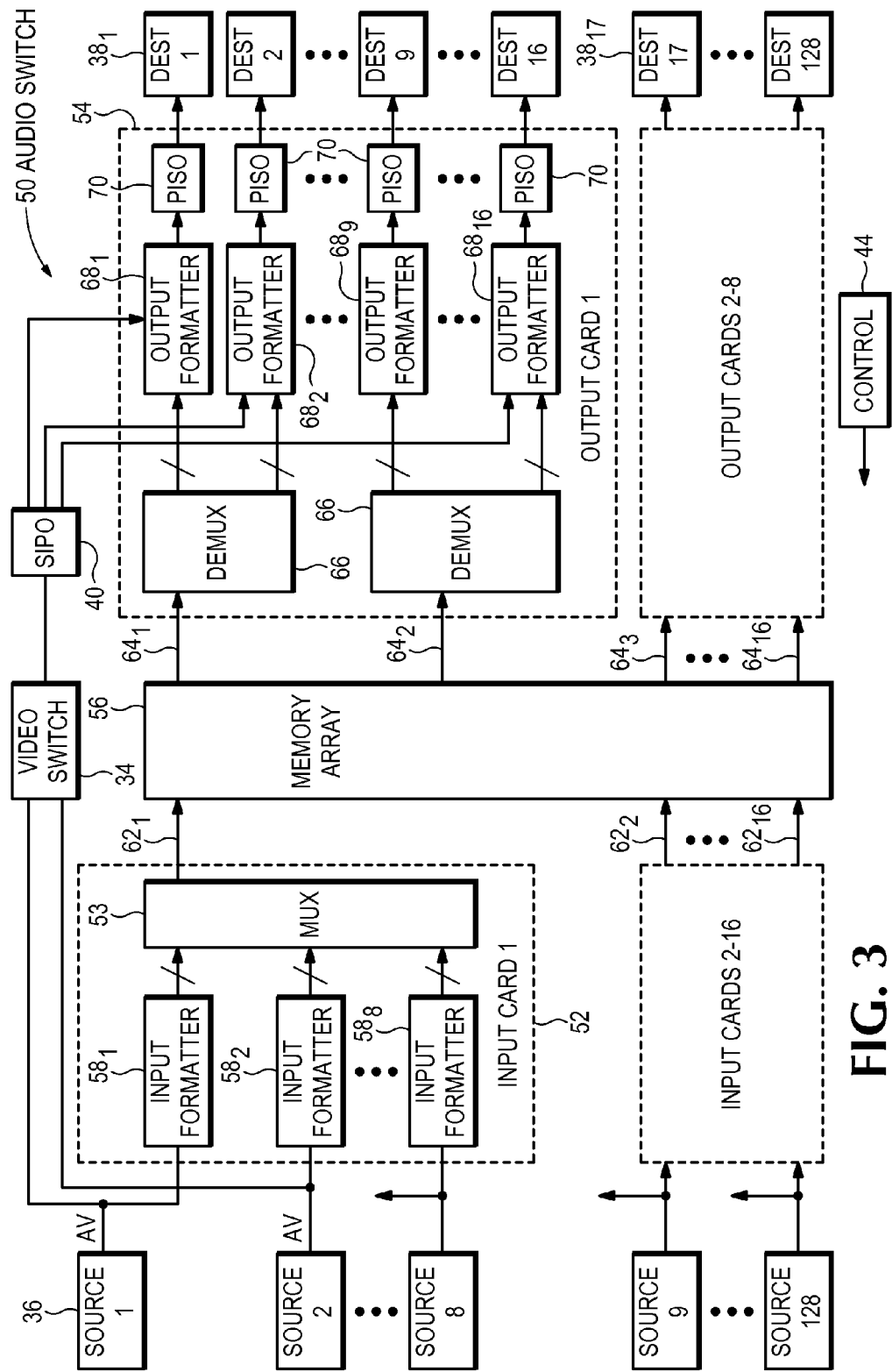
FIG. 3 is a schematic block diagram illustrating a router embodying subject matter disclosed in this application.

Referring to FIG. 3 of the drawings, the router comprises a video space switch 34 having 128 inputs connected to the router inputs respectively and 128 outputs. The video switch 34 routes the HD-SDI signal to an exclusive set of one or more of its 128 outputs.

The audio component of the HD-SDI signal AV contains up to 16 audio channels. It will be appreciated that the audio component of a given signal AV may contain fewer than 16 audio channels. It will also be appreciated that one or more of the channels of the audio component of the signal AV may convey data other than audio data associated with the video component. However, for convenience we will assume for the time being that each channel of the audio component of each signal AV conveys audio data in AES subframes and that the audio data conveyed by each channel can be used to generate an audio signal independently of the audio data conveyed by any other channel.

An audio switch 50 has 128 inputs connected to the router inputs respectively and 128 outputs.

The audio switch 50 is a shared memory time switch and comprises 16 input cards 52, each serving eight inputs of the audio switch, eight output cards 54 each serving 16 router outputs, and a memory array 56. Each input card 52 comprises eight input formatters 58 for the respective inputs served by that input card and each output card 54 comprises 16 output formatters 68 for the respective router outputs served by that output card.

Figure 4:
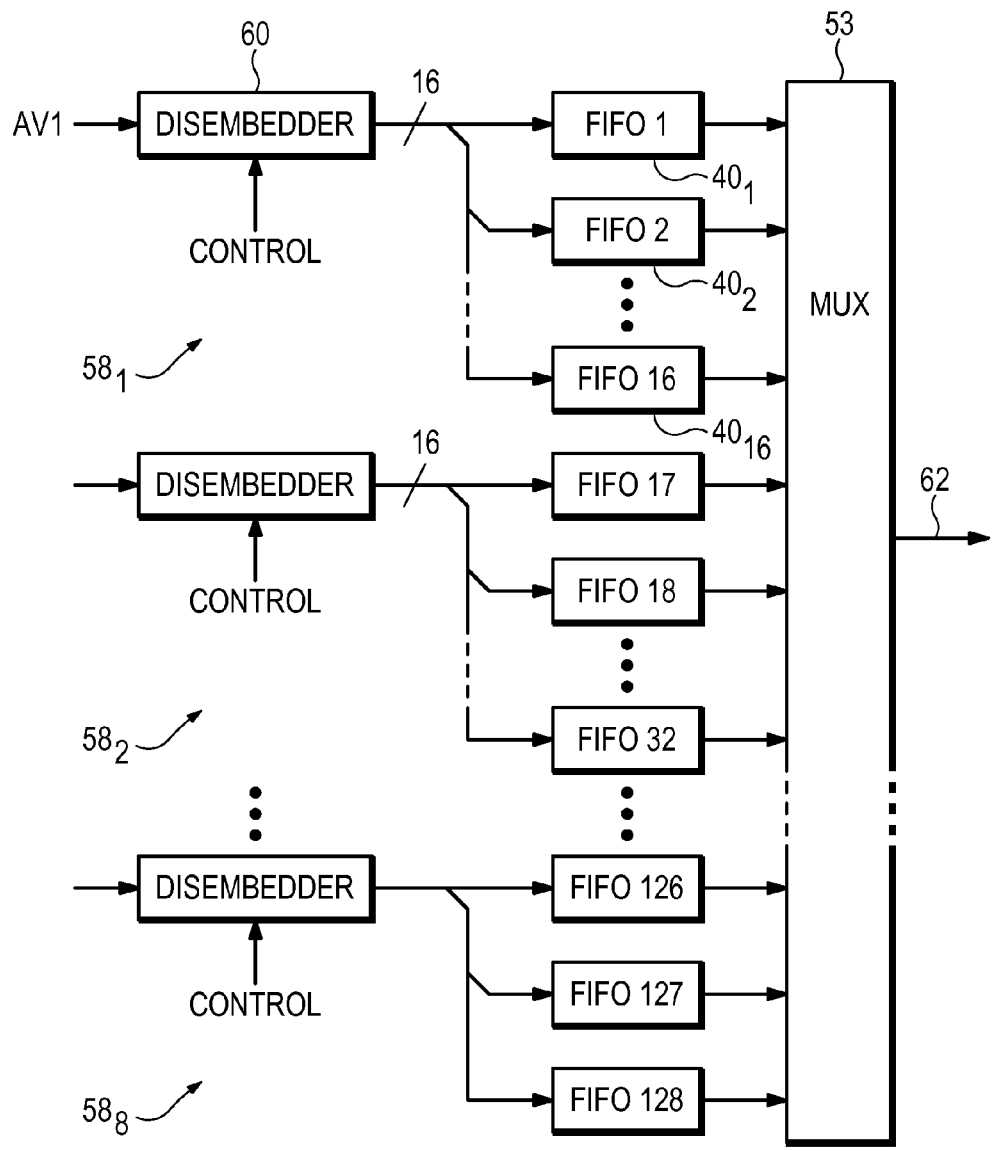
FIG. 4 is a more detailed block diagram of an input card of the router shown in FIG. 4.

Operation of the input formatters will be described with reference to the input card $52_1$, which serves sources $30_1$-$30_8$ Referring to FIG. 4, each input formatter 58 on the input card $52_1$ comprises a disembedder 60, which receives the HD-SDI program signal AV supplied to the corresponding input of the router and extracts the audio data samples of each audio channel from the HD-SDI signal. The disembedder 60 has 16 audio data outputs and outputs an audio data signal having up to 16 components, corresponding respectively to the (up to 16) audio channels of the signal AV and each comprising a stream of audio data sample words. Since a given signal AV may have fewer than 16 audio components embedded therein, the output signal of the disembedder may have fewer than 16 components. The components of the audio data signal are provided on respective audio data outputs of the disembedder.

For the purpose of this discussion, we will assume that the HD-SDI signal produced by source 1 contains audio data in audio channel 1 and does not contain audio data in audio channel 2.

Each input formatter 58 also comprises a relatively short FIFO input register (input FIFO) 40 for each of the 16 audio data outputs of the disembedder. Each input FIFO 40 is able to accommodate substantially fewer than 64 sample words and may be able to accommodate, for example, up to 32 sample words. We will assume that the input FIFOs $40_1$ and $40_2$ of the input formatter $58_1$ serve audio channels 1 and 2 respectively. The outputs of all the FIFOs 40 of the input card are connected to a multiplexer 53.

The disembedder 60 operates in conventional fashion and supplies sample words to the input FIFO $40_1$ at an average rate of 48 ks/s. It will be appreciated that the interval between consecutive samples words varies quite widely due to the bursty nature of the audio samples. When a sample word is received by the input FIFO, it immediately passes to the stage nearest the output of the register and not yet occupied by an earlier sample data word.

Each disembedder 60 and its associated input FIFOs exchange control messages with a controller 44, the functions of which may be at least partially distributed among the input cards 52 and output cards 54. The controller polls the outputs of the input FIFOs 40 at a higher rate than the audio sample rate. In an implementation, the controller polls the output of each input FIFO 40 at eight times the sample rate, i.e. at 384 kHz. If, for example, the input FIFO $40_1$ contains one or more sample words, the oldest sample word is output to the multiplexer 53 and is cleared from the FIFO $40_1$. However, because of the limited depth of the input FIFOs and the high rate at which the input FIFOs are polled by the controller, the FIFO $40_1$ will normally be empty, in which case the FIFO is unable to supply a valid sample word, i.e. a sample word containing the audio data of an AES subframe, to the multiplexer 53.

As indicated previously, each sample word of channel 1 that is supplied by the disembedder 60 to the input FIFO $40_1$ contains one audio sample. The sample words that are supplied to the input FIFO $40_1$, and are supplied to the multiplexer 53 when available, are 32 bit words that contain all the audio data of the corresponding AES subframe received by the disembedder. However, the controller 44 forces two bits of the sample word, corresponding to first and second bits of the four-bit preamble of the corresponding AES subframe, each to a logic high value (1). The first bit that is forced to a logic high level is an Audio Present bit indicating that the channel contains audio data and the second bit is a Sample Present bit indicating that the sample word contains an audio sample.

In the event that the input FIFO $40_1$ is empty when it is polled by the controller 44, the input formatter supplies a null sample word to the multiplexer 53. The bits of the null sample word corresponding to the audio data bits of an AES subframe may be set to an arbitrary value. The controller 44 sets the Audio Present bit of the null sample word to a logic high value, indicating that the channel contains audio data, and sets the Sample Present bit to a logic low value (0), indicating that the sample word does not contain an audio sample.

Since the HDI-SDI signal does not contain audio data in channel 2, the disembedder 60 does not supply sample words to the input FIFO $40_2$. Each time the controller 44 polls the register $40_2$, the input formatter supplies a null sample word in which the Audio Present bit is set to a logic low value, indicating that the channel does not contain audio data, and the Sample Present bit is set to a logic low value, indicating that the sample word does not contain an audio sample.

It will be appreciated from the foregoing that even though the audio component of a given signal AV may not contain 16 audio channels, each input formatter provides 16 streams of sample words at 384 ks/s at the outputs of the FIFOs 40. Thus, the input formatters $58_1$-$58_8$ together provide 128 streams of sample words to the multiplexer 53.

The multiplexer 53 receives the 16 streams of sample words from each of the eight input formatters on the input card and places the sample words on a high speed serial bus 62 in successive bus operating cycles, such that the position of a sample word from a particular input FIFO 40 in the sequence of bus operating cycles is strictly predetermined. The 16 input cards provide 16 high speed serial data signals on respective buses 62, each conveying 128 streams of sample words at 384 ks/s in time-division multiplexed fashion.

The sample words conveyed by the 16 high speed serial data signals are written into the memory array at addresses that are mapped to the respective positions of the sample words in the sequence of bus operating cycles. Each sample word is immediately read from the memory array and, depending on the configuration of the audio switch as determined by the controller 44, is either cleared or placed on one of 16 output buses 64 in a predetermined time slot of the bus operating cycle.

Each of the 16 output buses 64 serves eight of the 128 destinations 38. The operating cycle of each bus has 128 time slots, 16 of which are assigned to each of the eight destinations served by the bus.

The eight output cards 54 serve contiguous groups of router outputs, which are connected to respective destinations 38. As noted above, the router is configured so that the signal AV received from the source $36_1$ is to be routed to the destinations $38_1$ and $38_{17}$, which are connected to router outputs served by the output cards $54_1$ and $54_2$ respectively. In this case, in each read cycle of the memory array 56, 16 sample words originating respectively from the FIFOs $40_1$-$40_{16}$ of the input formatter $58_1$ are placed both in the 16 time slots of the bus $64_1$ that are assigned to destination $38_1$ and in the 16 time slots of the bus $64_3$ that are assigned to destination $38_{17}$.

Figure 5:
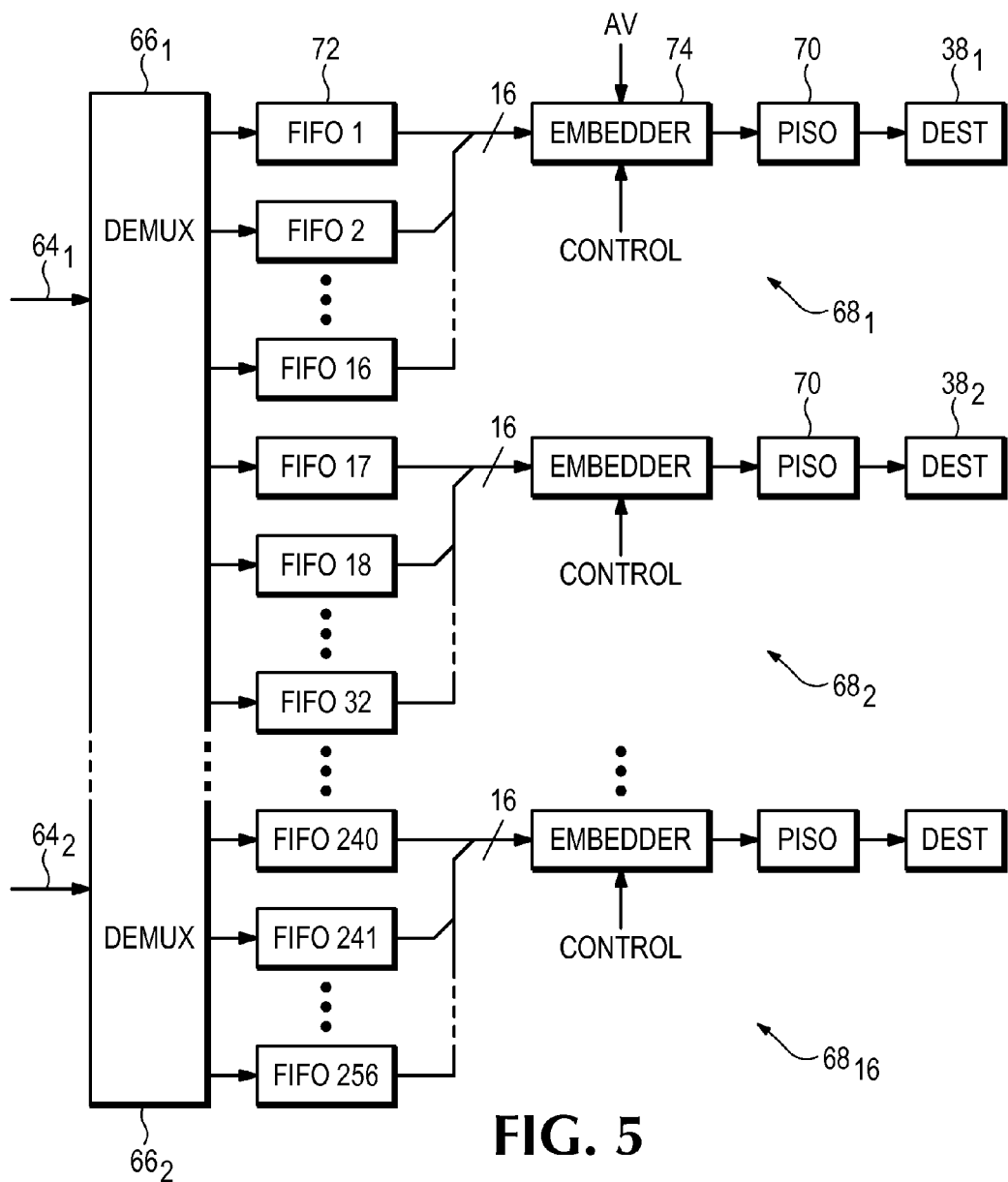
FIG. 5 is a more detailed block diagram of an output card of the router shown in FIG. 4.

Referring to FIGS. 3 and 5, each output card 54 is connected to two of the output buses 64 and comprises two demultiplexers 66 connected to the two output buses respectively. Each demultiplexer 66 serves eight output formatters 68, each of which comprises 16 first in, first out output registers (output FIFOs) 72 and an embedder 74. Each demultiplexer 66 receives a high speed serial signal conveying 128 streams of sample words from the respective output bus 64 and separates the signal into its respective streams, each supplying sample words in parallel form at a rate of 384 ks/s to each of the output FIFOs 72 of the eight output formatters.

Since the router is configured to deliver a signal to the router outputs connected to destinations $38_1$ and $38_{17}$ the demultiplexer $66_1$ of the output card $54_1$ supplies the 16 streams of sample words provided by the input formatter $58_1$ to the output FIFOs $72_1$-$72_{16}$ respectively of the output card $54_1$ and the demultiplexer $66_1$ of the output card $54_2$ supplies the 16 streams of sample words to the output FIFOs $72_1$-$72_{16}$ respectively of the output card $54_2$.

Figure 6:
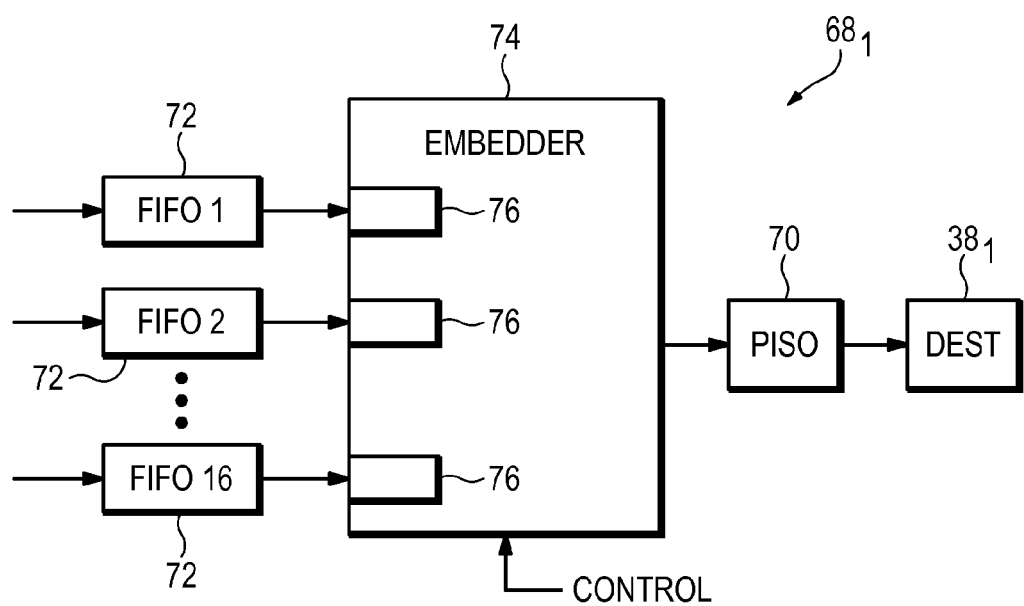
FIG. 6 is a more detailed block diagram of a portion of the output card shown in FIG. 5.

Each of the output FIFOs 72 supplies sample words at a rate of 384 kHz to the associated embedder 74. Referring to FIG. 6, the embedder includes 16 short input FIFOs 76 for receiving the (up to) 16 streams of sample words that are supplied by the FIFOs 72.

The controller 44 generates a Write Enable signal for writing sample words from each output FIFO 72 into the corresponding embedder input FIFO 76. The stream of sample words received by the output FIFO $72_1$ includes sample words that contain valid audio data, and for which the Sample Present bit is accordingly high, and sample words that do not contain valid audio data, i.e. null sample words, and for which the Sample Present bit is low. For all sample words, the Audio Present bit is high. The Write Enable signal is ANDed with the Sample Present bit and sample words for which the Sample Present bit is low are discarded whereas sample words for which the Sample Present bit is high are written into the embedder input FIFO 76 at an average rate of 48 ks/s.

The stream of sample words supplied to the FIFO register $72_2$ contains only null sample words, for which both the Sample Present and Audio Present bits are low. Because the Sample Present bits are low, all sample words are discarded. The controller responds to the Audio Present bits being low by signalling the embedder 74 that channel 2 does not contain valid audio data.

The embedder 74 receives the signal AV in parallel form from the SIPO 40 and, for each channel that contains valid audio data, the embedder also receives a stream of audio sample words each containing the data of an AES subframe, at an average rate per channel of 48 ks/s, from the corresponding embedder input FIFO 76. The controller controls reading of the sample words from the embedder input FIFOs 76 so that an appropriate number of sample words is made available to the embedder for inserting on each line of the signal AV. The embedder inserts the appropriate preamble in each word and writes 0, 1 or 2 audio sample words into the HANC data space of each line of the HD-SDI signal on which ancillary data is permitted and fills the remainder of the HANC data space with null values. Consequently, the audio data sample words that were present in the HD-SDI signal received from the SIPO 40 are overwritten.

The embedder outputs are connected to respective parallel in, serial out registers (PISOs) 70, which restore the parallel format signal AV to serial format for delivery to the router output. In this manner, the signal supplied by the source $34_1$ is delivered to the destinations $38_1$ and $38_{17}$.

As noted above, it is currently conventional for an embedder FIFO to operate at an average fullness of 50% in order to ensure that the FIFO will always contain enough samples to meet the needs of the embedder, as dictated by the embedder controller. In the case of the arrangement described with reference to FIGS. 2-5, the controller 44 sets a target value for the minimum fullness of the embedder input FIFO 76 having regard to the number of samples required over five consecutive frames. The target value of the minimum fullness may be set to one sample. It will be understood by those skilled in the art that for an HD-SDI signal having a 59.94 Hz frame rate the sequence of sample insertion only repeats once every five frames. However, in the event that the router switches between sources having dissimilar audio sample distributions, there may be a brief change in the average frequency at which audio samples are provided at an output of the audio switch 50.

Once every five frames the embedder controller 44 checks whether the minimum fullness of the embedder input FIFO during the preceding five frames was less than, equal to, or greater than the target minimum fullness. If the minimum fullness was equal to the target minimum fullness, no change is made to the pointers defining the start and end of samples in the FIFO. If the minimum fullness was greater or less than the target minimum fullness, the embedder controller adjusts one or more of the pointers to drop or add one or more samples. By not running below the target minimum fullness, the probability of the FIFO being empty when there is a switch between sources having dissimilar audio sample distributions, which would necessitate adding a sample when it would not normally be desired, is reduced. By not running above the target minimum fullness, the audio delay is minimized. In addition, by periodically adjusting all the input FIFOs 76 to the same target minimum fullness the advantage is obtained that if the same source is routed to more than one output channel, those multiple output channels will be in phase.

It will be appreciated from the foregoing that by running the FIFOs 40 and 72 and the memory array 56 at a multiple of the audio sample rate, and by allowing the FIFOs 40 and 76 to run down to empty, or near empty, much of the differential delay that occurs between the audio signal component and the video signal component using the router described with reference to FIG. 1 is eliminated.

In the event that the HD-SDI signal produced by source 1 referred to above contained left and right stereo channels of an audio signal in channels 1 and 2, a minor phase difference between the two channels would be tolerable, since a sequence of AES subframes of one channel, e.g. channel 1, may be decoded as meaningful audio without data of the other channel and the difference in timing between the two channels would not normally be objectionable. However, in some cases it may be essential to avoid differences in timing between adjacent channels.

If the HD-SDI signal produced by source 1 contains Dolby E packets divided between the subframes of channels 1 and 2 and the router is configured to place the subpackets in channels 3 and 4 of the HD-SDI signal delivered to destination 1, the two subframes containing the two subpackets of each packet will arrive at the outputs of the respective FIFOs 72 at the same time. However, after a change in configuration of the router it cannot be guaranteed that the number of sample words ahead of the two subpackets of the first packet, in the input FIFOs 76 respectively, will be the same. If the two input FIFOs 76 differ in fullness, the two subpackets will arrive at the outputs of the FIFOs 76 out of phase and therefore will remain out of phase after embedding and subsequent disembedding. A Dolby E packet cannot be accurately decoded without the data of both subpackets. Consequently, the data conveyed in the two subframes of an AES frame cannot be decoded as a Dolby E packet.

The header of a Dolby E packet has four words. When a Dolby E packet is placed in an AES frame, two words of the header are placed in one of the subframes and the other two words are placed in the other subframe. The controller 44 tests the two subframes of each frame to determine whether they contain the words that characterize the header of a Dolby E packet and, if so, checks the fullness of the input FIFOs 76. Should the controller determine that the input FIFOs 76 are not of equal fullness, it clears sufficient data words from the input FIFO 76 that is more full to equalize the fullness of the two input FIFOs respectively. Then the number of data words ahead of each subframe, in the FIFOs 76 respectively, will be the same and the two subpackets will remain in the proper phase relationship to allow decoding of the Dolby E packet. This approach may also be advantageous in the event a given source is assigned to multiple outputs, because adjusting the fullness of the input FIFOs in this manner helps to keep the outputs in phase.

It will be appreciated that the subject matter claimed herein is not restricted to the particular embodiment that has been described, and that variations may be made therein without departing from the scope of the subject matter defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. An audio/video router for receiving a composite input signal having an audio component and a video component at an input of the router and providing a composite output signal containing the audio component and the video component at an output of the router, the router comprising:
a space switch for receiving at least the video component of the composite input signal and delivering the video component to an output of the space switch, and a shared memory time switch comprising:
an input formatter for receiving the composite input signal and providing an intermediate stream of data words,
a switch core for receiving the intermediate stream of data words and providing the intermediate stream of data words to an output of the switch core, and
an output formatter for receiving the intermediate stream of data words from the output of the switch core,
wherein the input formatter comprises a demultiplexer for receiving the composite input signal and separating a stream of audio data words at an average frequency F1 from the video component, a FIFO input register for receiving the separated stream of audio data words at an input of the FIFO input register and making the audio data words available successively at an output of the FIFO input register, and a read enable device for polling the output of the FIFO input register at a frequency F2, greater than F1, and, in the event that an audio data word is available at the output of the FIFO input register, conveying the audio data word from the output of the FIFO input register to the switch core and otherwise conveying a null data word to the switch core, whereby the intermediate stream of data words comprises both audio data words and null data words, and wherein the output formatter comprises a multiplexer for combining the audio data words of the intermediate stream with the video component of the input signal delivered to the output of the space switch to provide said composite output signal.

2. An audio/video router according to claim 1, wherein the switch core has an input connected to receive data words from the read enable device and is operative to direct each data word to a selected output of the switch core in at least one clocked read/write operation, and wherein the read/write operations occur at a rate F3, which is greater than F1.

3. An audio/video router according to claim 2, wherein F3 is equal to F2.

4. An audio/video router according to claim 1, wherein the switch core has a plurality of inputs and a plurality of outputs, the audio switch comprises a plurality of input formatters in signal communicating relationship with respective inputs of the switch core and a plurality of output formatters in signal communicating relationship with respective outputs of the switch core, and the switch core is operative to connect an output of the switch core non-exclusively to a selected input of the switch core.

5. An audio/video router according to claim 4, comprising a video switch having a plurality of inputs corresponding respectively to the inputs of said switch core and a plurality of outputs corresponding respectively to the outputs of said switch core.

6. A method of routing a composite input signal having an audio component and a video component from an input to an output, comprising:
separating a stream of audio data words at an average frequency F1 from the video component,
supplying the separated stream of audio data words sequentially to a FIFO input register,
polling an output of the FIFO input register at a frequency F2, greater than F1, and, in the event that an audio data word is available at the output of the FIFO input register, conveying the audio data word from the output of the FIFO input register to an input of a signal path and otherwise conveying a null data word to the input of the signal path, whereby the signal path conveys a stream of data words that comprises both audio data words and null data words,
receiving said stream of data words at an input of a shared memory time switch and employing the shared memory time switch to deliver said stream of data words to an output of the shared memory time switch, receiving said composite input signal at an input of a space switch and employing the space switch to deliver said composite input signal to an output of the space switch, and combining the audio data words of said stream of data words delivered to said output of the shared memory time switch with the video component of the composite input signal delivered to said output of the space switch.

7. An audio/video router according to claim 1, wherein the multiplexer comprises a multiplexer input FIFO register for receiving the audio data words of the intermediate stream and the router comprises a controller for periodically comparing a minimum fullness of the multiplexer input FIFO register over a predetermined period with a target minimum fullness value and adjusting the fullness of the multiplexer input FIFO register toward said target minimum fullness value.

8. An audio/video router according to claim 1, wherein the space switch has multiple inputs and multiple, outputs and is operative to route a signal that conveys at least the video component of a composite input signal received at any one of its multiple inputs to an exclusive set of one or more of its multiple outputs.

9. An audio/video router according to claim 1, wherein the shared memory time switch has multiple inputs and multiple outputs and is operative to route a signal that conveys at least the audio component of a composite input signal received at any one of its multiple inputs to an exclusive set of one or more of its multiple outputs.

10. A method according to claim 6, comprising:

separating the audio data words of said stream from the null data words of said stream at the output of the shared memory time switch, employing a multiplexer to combine the audio data words separated from said stream with the video component of the composite input signal delivered to said output of the space switch, wherein the multiplexer comprises a multiplexer input FIFO register, supplying the audio data words separated from said stream to the multiplexer input FIFO register, periodically comparing a minimum fullness of the multiplexer input FIFO register over a predetermined period with a target minimum fullness value, and adjusting the fullness of the multiplexer input FIFO register toward said target minimum fullness value.

* * * * *